Feb. 1, 1927.
H. F. HITNER
1,615,841
PROCESS AND APPARATUS FOR DRAWING SHEET GLASS
Filed Aug. 20, 1925　　2 Sheets-Sheet 2
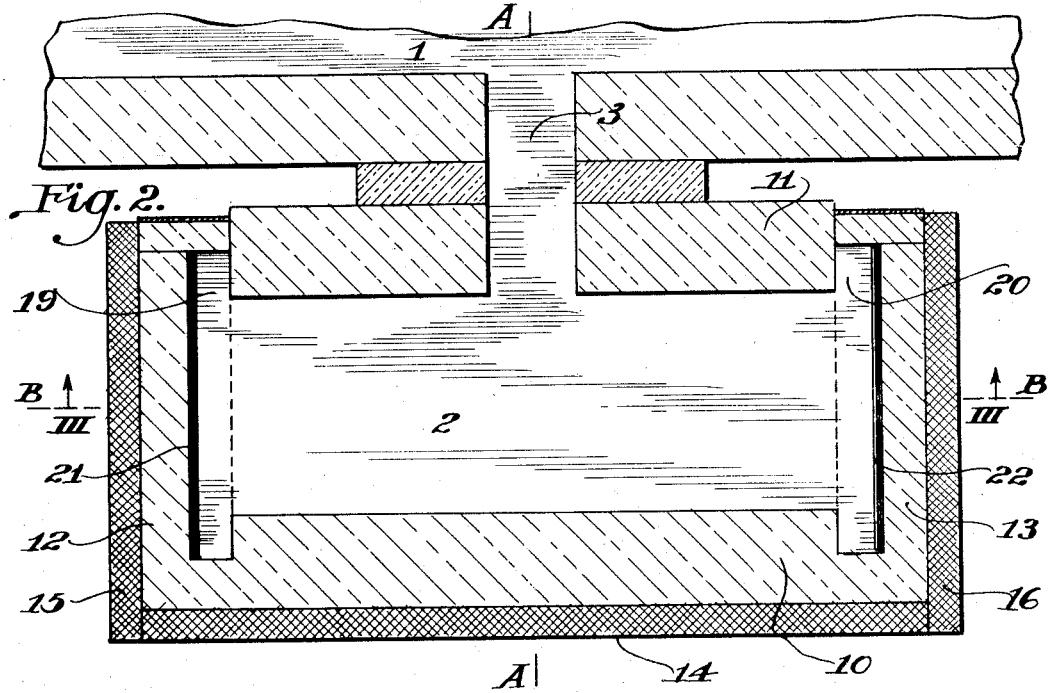
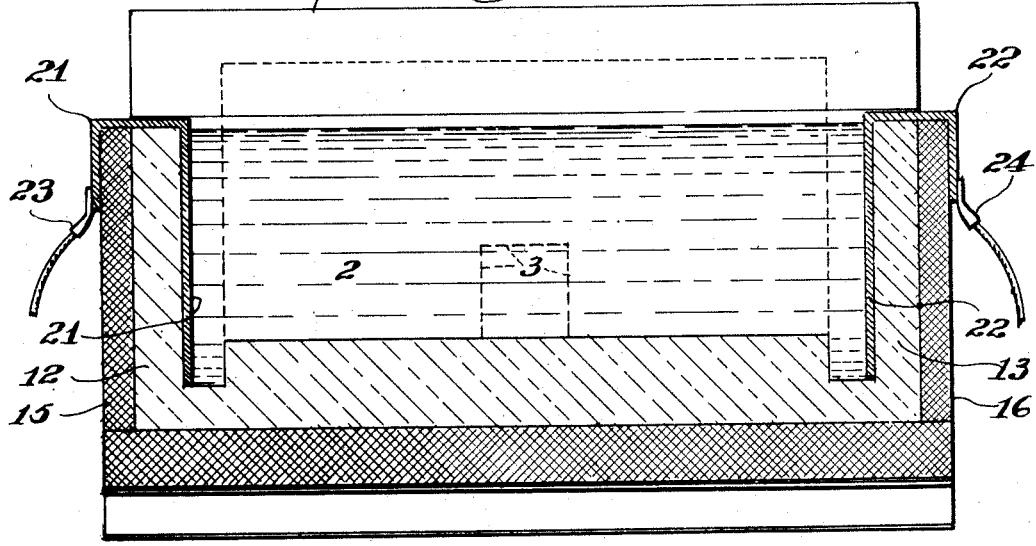
INVENTOR
Harry F Hitner
by
James C Bradley
atty Patented Feb. 1, 1927.

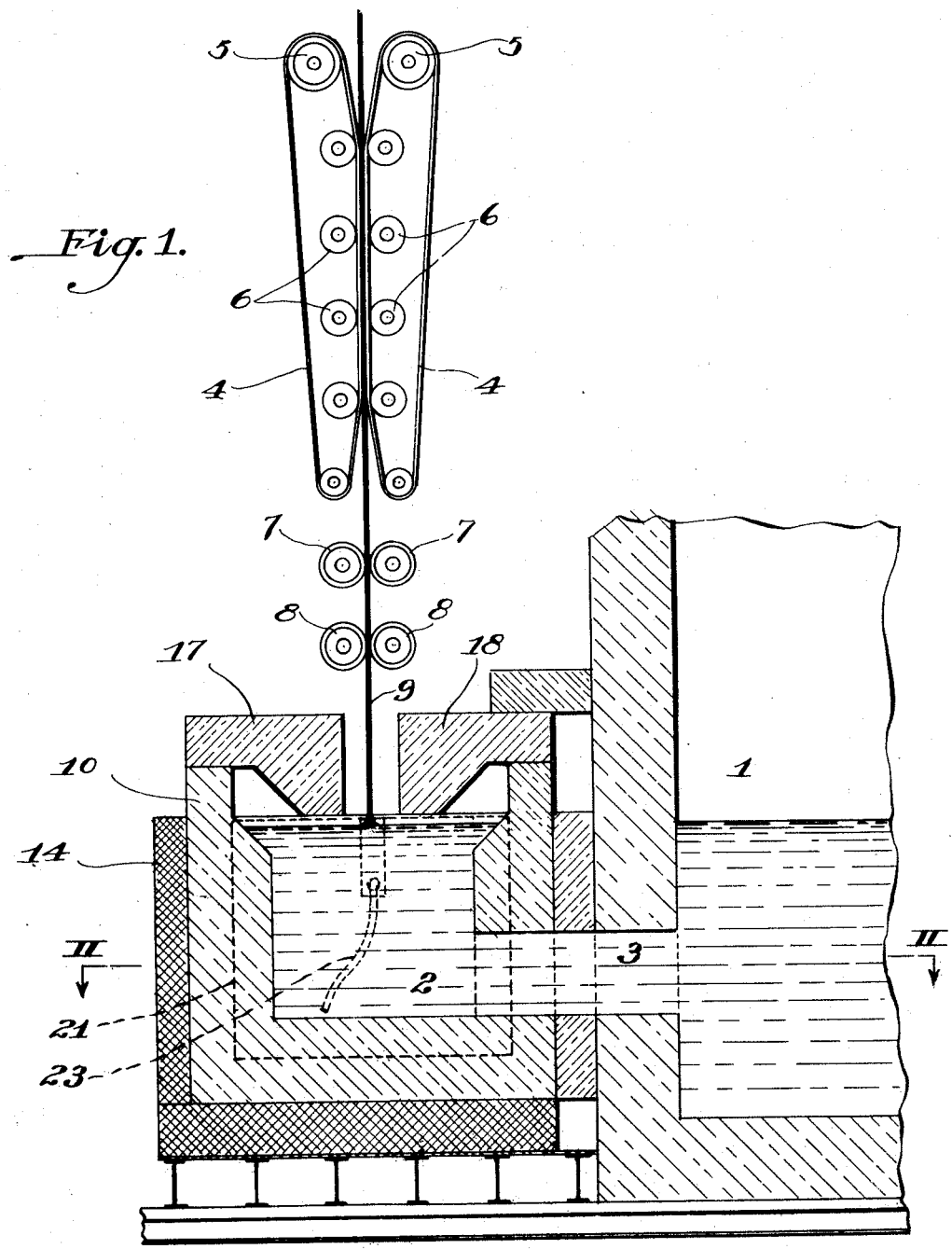

1,615,841

UNITED STATES PATENT OFFICE.

HARRY F. HITNER, OF PITTSBURGH, PENNSYLVANIA, ASSIGNOR TO PITTSBURGH PLATE GLASS COMPANY, A CORPORATION OF PENNSYLVANIA.

PROCESS AND APPARATUS FOR DRAWING SHEET GLASS.

Application filed August 20, 1925. Serial No. 51,326.

The invention relates to a process for drawing sheet glass in a continuous ribbon from a body of molten glass and particularly to the method and means for controlling the body of glass in the forehearth or extension from the melting tank from which the generation of the sheet occurs. It has for its objects, the provision of an arrangement and a procedure; (1) whereby the temperature of the glass in the forehearth may be maintained uniform; (2) in the use of which the temperature of the glass may be regulated with a great degree of exactness; (3) which involves a reduction in the cost of operation; and (4) by the use of which breakage is avoided and a flat sheet is secured. One embodiment of the invention is illustrated in the accompanying drawings wherein:

Figure 1 is a vertical section through the apparatus, the drawing mechanism being shown in diagrammatic form. Fig. 2 is a horizontal section on the line II—II of Fig. 1. And Fig. 3 is a vertical section on the line III—III of Fig. 2.

Referring to the drawings, 1 is the outlet end of a melting tank, preferably of the regenerator type, and 2 is a drawing kiln having communication with the melting tank so that hot glass is supplied to the kiln to take the place of the glass which is withdrawn in the formation of the continuous sheet or ribbon. The withdrawal of the glass preferably occurs through a neck or outlet 3 lying on the center line A—A of the melting tank and entering the side of the drawing kiln as indicated in Figs. 1 and 2, the neck being located preferably midway between the ends of the drawing kiln and at right angles to the longitudinal center line B—B of the drawing kiln.

The continuous drawing of the ribbon may be accomplished by any desired means, the one shown in diagrammatic form consisting of a pair of asbestos curtains 4. 4 passing around the driven pulleys 5, 5 and held against the sides of the sheet to give it the necessary traction by means of the rolls 6, 6, 6, etc. yieldingly pressed inward, this form of drawing mechanism being well known in the art and requiring no detailed description. Beneath the curtains 4, 4 and also assisting in the drawing are the pairs of driven rolls 7, 7 and 8, 8. The glass sheet is drawn up continuously through this drawing apparatus or one of any type which it may be found expedient to employ and is annealed and cooled and finally cut into sections.

The drawing kiln 2 is long and narrow in shape, and preferably has a relatively small cross section so that the body of glass whose temperature is to be regulated and controlled and from which the ribbon or sheet 9 is to be generated is of small volume. In order to conserve the heat of the glass in the drawing kiln, the clay walls 10, 11, 12 and 13 are preferably surrounded and insulated by other walls of insulating material, such as silocel, such walls being designated by the numerals 14, 15 and 16. Lying above the glass and in the kiln and serving as a cover therefor are the curtain blocks 17 and 18 preferably of the cross section indicated in Fig. 1. In order that the incoming glass from the neck 3 may not affect or modify the temperature of the glass in the drawing kiln to too great an extent, such neck is made of relatively small cross section and is brought into communication with the kiln adjacent the bottom thereof so that the incoming glass from the tank reaches the kiln at a point as remote as possible from the line of generation of the sheet, the purpose being to avoid, in so far as is possible, any variations in temperature due to outside causes at the point from which the sheet is drawn and to avoid, in so far as is possible, any disturbance of the heat balance in the kiln on the two sides of the center line of the sheet which is being drawn, as this sheet is much more apt to be flat and free from strain if the body of glass from which it is drawn is homogeneous throughout in its temperature.

As indicated in Fig. 2, the horizontal cross section of the kiln is preferably in the form of an I with the enlargement 19 and 20 at the ends extending out laterally beyond the confines of the body of the tank. Similarly, by reference to Fig. 3, it will be seen that the enlarged end portions also extend down below the level of the bottom of the body of the tank. At the outer ends of these enlargements are mounted the two electrodes 21 and 22, preferably in the form of metal plates of high heat resisting composition, such as the composition known as "ascoloy", which consists of about 75 per cent of iron and 25 per cent of chromium. This composition has practically no reaction with the glass at the temperatures at which it is used, so that there is no discoloration of the glass due to this cause. Any other composition having similar properties may be substituted. These plates are provided with terminals 21 and 22, preferably integral therewith, with which the leads 23 and 24 are connected for supplying the necessary current. The area of the plates 21 and 22, being greater than the cross sectional area of the body of glass in the body of the tank 2, it follows that when a current of electricity is caused to pass between the two plates, the entire volume of glass in the kiln is exposed to the heating action of the current. I have found that under these conditions, a uniform temperature may be maintained throughout a body of glass, which condition tends to give a glass sheet which is perfectly flat and free from strain and avoids the production of devitrified glass which is often formed in drawing kilns or furnaces where portions of the glass are exposed to certain temperatures for prolonged periods, such temperatures being less than those of the main body of glass from which the drawing occurs. The mounting of the electrodes in the enlarged ends of the kiln also serves the function of maintaining the plates at a lower temperature than would otherwise be the case, so that any tendency of the glass to react with the metal to produce discoloration is correspondingly reduced. The heating of the body of glass lying between the terminals is furthermore uniform where plates are employed of larger area than the body of the tank than is the case where the plates are of the same area as the cross sectional area of the kiln. By the use of this heating arrangement a very exact regulation of the temperature of the glass may be maintained, thus insuring uniform and drawing conditions.

What I claim is:

1. The combination with a melting tank, of a transverse drawing kiln, a connecting neck between the adjacent sides of the melting tank and the kiln below the level of the glass, electrodes at the opposite ends of the kiln, means for causing a flow of electric current between the electrodes throughout the major portion of the cross section of the kiln to heat the glass in the kiln, and means for drawing a sheet of glass upward from the kiln.

2. The combination with a melting tank, of a transverse drawing kiln, a connecting neck between the melting tank and the kiln below the level of the glass, electrodes at the opposite ends of the kiln in the form of plates of an area at least equal to the transverse cross section of the kiln, means for causing a flow of electric current between the electrodes to heat the glass in the kiln, and means for drawing a sheet of glass upward from the kiln.

3. The combination with a melting tank, of a transverse drawing kiln in the form of an I in horizontal cross section, a connecting neck between the melting tank and the body of the kiln intermediate the ends thereof and beneath the level of the glass, electrodes in the enlarged ends of the kiln in the form of plates of an area greater than the transverse cross section of the body of the kiln, and means for drawing a sheet of glass upward from the kiln.

4. The combination with a melting tank, of a long narrow drawing kiln extending transversely of the center line of the melting tank and having communication between its central portion and the melting tank in the form of a neck of relatively small cross section lying entirely below the level of the glass, electrodes in the form of plates mounted at the ends of the kiln, lying at right angles to the center line thereof and presenting areas of contact to the glass in the kiln at least equal to the cross sectional area of the glass in the kiln, means for causing a flow of electric current between the electrodes so that the entire body of glass in the kiln is exposed to the action of the current, and means for drawing a sheet of glass upwardly from the kiln.

5. The combination with a melting tank, of a long narrow drawing kiln with enlarged ends extending transversely of the centerline of the melting tank and having communication between its central portion and the melting tank in the form of a neck of relatively small cross section lying entirely below the level of the glass, electrodes in the form of plates of greater area than the cross section of the kiln lying in the enlarged ends thereof, means for causing a flow of electric current between the electrodes so that the entire body of glass in the kiln is exposed to the action of the current, and means for drawing a sheet of glass upwardly from the kiln.

6. The combination with a melting tank, of a long narrow drawing kiln extending transversely of the centerline of the melting tank and having enlarged ends whose confines extend out past the side walls of the body of the kiln and also below the bottom of the kiln, a neck between the body of the kiln and the melting tank, electrodes in the form of plates of greater area than the cross section of the kiln lying in the enlarged ends thereof, means for causing a flow of electric current between the electrodes so that the entire body of glass in the kiln is exposed to the action of the current, and means for drawing a sheet of glass upwardly from the kiln.

7. A process of making sheet glass, which consists in providing a pool of molten glass of a length greater than the width of the sheet to be formed and of relatively small cross section in a plane transverse to the long dimension of the pool, regulating the temperature of the pool by causing a flow of electric current longitudinally thereof throughout substantially its entire cross sectional area, drawing a sheet of glass upward continuously from the pool, and continuously supplying molten glass to the pool to replace the glass which is withdrawn.

8. A process of making sheet glass, which consists in providing a pool of molten glass of a length greater than the width of the sheet to be formed and of relatively small cross section in a plane transverse to the long dimension of the pool, regulating the temperature of the pool by causing a flow of electric current longitudinally thereof throughout substantially its entire cross sectional area, drawing a sheet of glass upward continuously from the pool, and continuously supplying molten glass to the pool at a level adjacent the bottom thereof to replace the glass which is withdrawn.

9. A process of making sheet glass, which consists in providing a pool of molten glass of a length greater than the width of the sheet to be formed and of relatively small cross section in a plane transverse to the long dimension of the pool by causing a flow of electric current longitudinally thereof throughout substantially its entire cross sectional area, drawing a sheet of glass upward continuously from the pool, and continuously supplying molten glass to the pool intermediate its ends and at a level adjacent the bottom thereof to replace the glass which is withdrawn.

In testimony whereof, I have hereunto subscribed my name this 18th day of July, 1925.

HARRY F. HITNER.